(12) United States Patent
Witczak et al.

(10) Patent No.: US 12,157,656 B2
(45) Date of Patent: Dec. 3, 2024

(54) ELEVATOR CONDITION BASED MAINTENANCE USING AN IN-CAR CAMERA

(71) Applicant: Otis Elevator Company, Farmington, CT (US)

(72) Inventors: Tadeusz Pawel Witczak, Farmington, CT (US); Ankit Anand Gupta, Uttar Pradesh (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1450 days.

(21) Appl. No.: 16/601,669

(22) Filed: Oct. 15, 2019

(65) Prior Publication Data
US 2021/0107769 A1 Apr. 15, 2021

(51) Int. Cl.
*B66B 5/00* (2006.01)
*B66B 1/24* (2006.01)
(Continued)

(52) U.S. Cl.
CPC .......... *B66B 5/0025* (2013.01); *B66B 1/2408* (2013.01); *B66B 1/28* (2013.01); *B66B 1/3461* (2013.01); *B66B 3/002* (2013.01); *B66B 5/0012* (2013.01); *B66B 5/0087* (2013.01); *B66B 5/02* (2013.01); *B66B 13/146* (2013.01); *G06T 7/0004* (2013.01); *G06V 20/52* (2022.01);
(Continued)

(58) Field of Classification Search
CPC ....... B66B 5/0025; B66B 1/2408; B66B 1/28; B66B 1/3461; B66B 3/002; B66B 5/0012; B66B 5/0087; B66B 5/02; B66B 13/146; B66B 2201/222; B66B 2201/235; B66B 5/0018; G06T 7/0004; G06T 2207/30164; G06V 20/52; H04N 7/18
See application file for complete search history.

(56) References Cited

U.S. PATENT DOCUMENTS

2016/0292521 A1 10/2016 Fang et al.
2018/0105397 A1* 4/2018 Odye .................... B66B 5/0012
(Continued)

FOREIGN PATENT DOCUMENTS

CN 103287931 A 9/2013
CN 107539855 A 1/2018
(Continued)

OTHER PUBLICATIONS

Extended European Search Report issued Mar. 18, 2021 for Application No. 20202144.0.
(Continued)

*Primary Examiner* — Jeffrey Donels
(74) *Attorney, Agent, or Firm* — CANTOR COLBURN LLP (57) ABSTRACT

Provided are embodiments for method performing elevator condition-based maintenance using an in-car camera. The method includes monitoring one or more conditions of an elevator system, and analyzing image data obtained from monitoring one or more conditions of the elevator system. The method also includes validating the one or more conditions of the elevator system, and executing an action based on the validation of the one or more conditions. Also provided are embodiments for a system for implementing the method described herein.

19 Claims, 5 Drawing Sheets

(51) Int. Cl.
  *B66B 1/28*    (2006.01)
  *B66B 1/34*    (2006.01)
  *B66B 3/00*    (2006.01)
  *B66B 5/02*    (2006.01)
  *B66B 13/14*   (2006.01)
  *G06T 7/00*    (2017.01)
  *G06V 20/52*   (2022.01)
  *H04N 7/18*    (2006.01)

(52) U.S. Cl.
  CPC ... *B66B 2201/222* (2013.01); *B66B 2201/235* (2013.01); *G06T 2207/30164* (2013.01); *H04N 7/18* (2013.01)

(56) References Cited

U.S. PATENT DOCUMENTS

2019/0135581 A1*  5/2019  Beaubois ............... B66B 5/024
2020/0048045 A1*  2/2020  Xiong ................. B66B 13/143

FOREIGN PATENT DOCUMENTS

| EP | 3309107 A1 | 4/2018 | |
| EP | 3608280 A1 * | 2/2020 | ........... B66B 1/2408 |
| JP | 201111872 A | 1/2011 | |
| JP | 2013124189 A | 6/2013 | |
| JP | 6581260 B1 | 9/2019 | |

OTHER PUBLICATIONS

Chinese Office Action for Application No. 202011102261.6; Issued Jul. 14, 2022; 10 Pages.

* cited by examiner

ELEVATOR CONDITION BASED MAINTENANCE USING AN IN-CAR CAMERA

BACKGROUND

The present disclosure relates generally to elevator systems, and more specifically to elevator car condition sensing and detection.

In today's environment many elevators are equipped with various sensors to obtain performance information and state information of the elevator system. These sensors and components may require maintenance from time to time. For inspection of the elevator system, a mechanic physically inspects the various components and subsystems of the elevator system. Therefore, the mechanic must be dispatched to the location and in some instances, due to the confined nature of the elevator system, a physical inspection of components of an elevator car can be difficult. There may be a need to verify the system status and sensor operation or modify the operation of the elevator system based on the detected conditions without physically dispatching the mechanic to the location of the elevator system.

BRIEF SUMMARY

According to an embodiment, a system includes a camera system coupled to an elevator system; and a processor, wherein the processor is in communication with the camera system and provides image data to the processor. The processor is configured to monitor one or more conditions of the elevator system; analyze the image data from the camera system; validate the one or more conditions of the elevator system based on the image data; and execute an action based on the validation of the one or more conditions.

In addition to one or more of the features described herein, or as an alternative, further embodiments include using a controller configured to control the elevator system and provide state information to the processor.

In addition to one or more of the features described herein, or as an alternative, further embodiments include a processor that is configured to compare the image data and indicators in the elevator system based on the state information of the elevator system, and validate, using image analysis, the state of the elevator system based at least in part on the comparison.

In addition to one or more of the features described herein, or as an alternative, further embodiments include a processor that is configured to remove false alarm information based on the validation of the one or more conditions of the elevator car.

In addition to one or more of the features described herein, or as an alternative, further embodiments include a processor that is configured to generate at least one of a traffic patterning model or a maintenance model after removing the false alarm information.

In addition to one or more of the features described herein, or as an alternative, further embodiments include a processor that is configured to perform presence detection to detect at least one of an object or a passenger in the elevator system.

In addition to one or more of the features described herein, or as an alternative, further embodiments include performing presence detection to detect at least one of an object or a passenger in the elevator system; and provide an alarm based at least in part on the presence detection.

In addition to one or more of the features described herein, or as an alternative, further embodiments include using actions that include at least one of performing condition-based maintenance or monitoring the performance of the elevator system.

In addition to one or more of the features described herein, or as an alternative, further embodiments include performing an action that includes an output of the camera system that provides a command to adjust an elevator door dwell time or an elevator door speed based on identifying an object or user type.

In addition to one or more of the features described herein, or as an alternative, further embodiments include performing an action that includes an output of the camera system that provides a command to the elevator system to assign elevator cars based on a number of users on one or more elevator cars of the elevator system.

In addition to one or more of the features described herein, or as an alternative, further embodiments include performing an action that includes monitoring the one or more conditions includes monitoring at least one of button operations of an elevator car, a direction of an elevator car, a cabin operating panel, a number of runs of an elevator car, door cycles and door reversals of an elevator car using the camera system.

According to an embodiment, a method includes monitoring one or more conditions of an elevator system; analyzing image data obtained from monitoring one or more conditions of the elevator system; validating the one or more conditions of the elevator system; and executing an action based on the validation of the one or more conditions.

In addition to one or more of the features described herein, or as an alternative, further embodiments include controlling, using a controller, the elevator system and provide state information to the processor.

In addition to one or more of the features described herein, or as an alternative, further embodiments include comparing the image data and indicators in the elevator system based on the state information of the elevator system; and validating the state information of the elevator system based at least in part on the comparison.

In addition to one or more of the features described herein, or as an alternative, further embodiments include removing false alarm information based on the validation of the one or more conditions of the elevator car; and generating at least one of a traffic patterning model or a maintenance model after removing the false alarm information.

In addition to one or more of the features described herein, or as an alternative, further embodiments include providing an alarm that is a left baggage alarm upon detection of baggage.

In addition to one or more of the features described herein, or as an alternative, further embodiments include performing presence detection to detect at least one of an object or a passenger in the elevator system; and providing an alarm based at least in part on the presence detection.

In addition to one or more of the features described herein, or as an alternative, further embodiments include actions including at least one of performing condition-based maintenance or monitoring the performance of the elevator system.

In addition to one or more of the features described herein, or as an alternative, further embodiments include actions including an output of the camera system provides a command to adjust an elevator door dwell time or an elevator door speed based on identifying an object or user type.

In addition to one or more of the features described herein, or as an alternative, further embodiments include actions including an output of the camera system providing a command to the elevator system to assign elevator cars based on a number of users on one or more elevator cars of the elevator system.

In addition to one or more of the features described herein, or as an alternative, further embodiments include monitoring the one or more conditions includes monitoring at least one of button operations of an elevator car, a cabin operating panel, a direction of an elevator car, a number of runs of an elevator car, door cycles and door reversals of an elevator car using the camera system.

Technical effects of embodiments of the present disclosure include validating alarm states of the system by performing an image analysis using an in-car camera. In addition, the image analysis can be used to generate models for the system and eliminate alarm states/faults that are not confirmed or are triggered for unrelated reasons. More robust models can be efficiently built for operating the system using the validated conditions.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

The precision and quality of condition-based maintenance (CBM) is dependent on machine learning and the quality of the input data. Common solutions use dedicated sensors such as accelerometers, gyroscopes, hall sensors or controller data to identify a door state, a number of cycles/reversals, and abnormal behavior/failures to build reliable CBM models. At early stages of the model building, sensor readings are not conclusive and often need visual/onsite conformation. Elevators are often equipped with security cameras or installed with other solutions that may use cameras for different purposes.

In some situations, the camera data can be leveraged to perform image analytics to measure things such as light level in the car, validation of button light operation and presence detection.

The system can use the acquired data for faster model building for elevator traffic patterning and maintenance scheduling. In addition, the system can be used to confirm failure conditions. The failure conditions originating from unrelated events can be removed which can improve the generation of the model for the elevator. In some embodiments, existing cameras can be leveraged to obtain the image data without requiring the installation of new equipment to capture the data.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
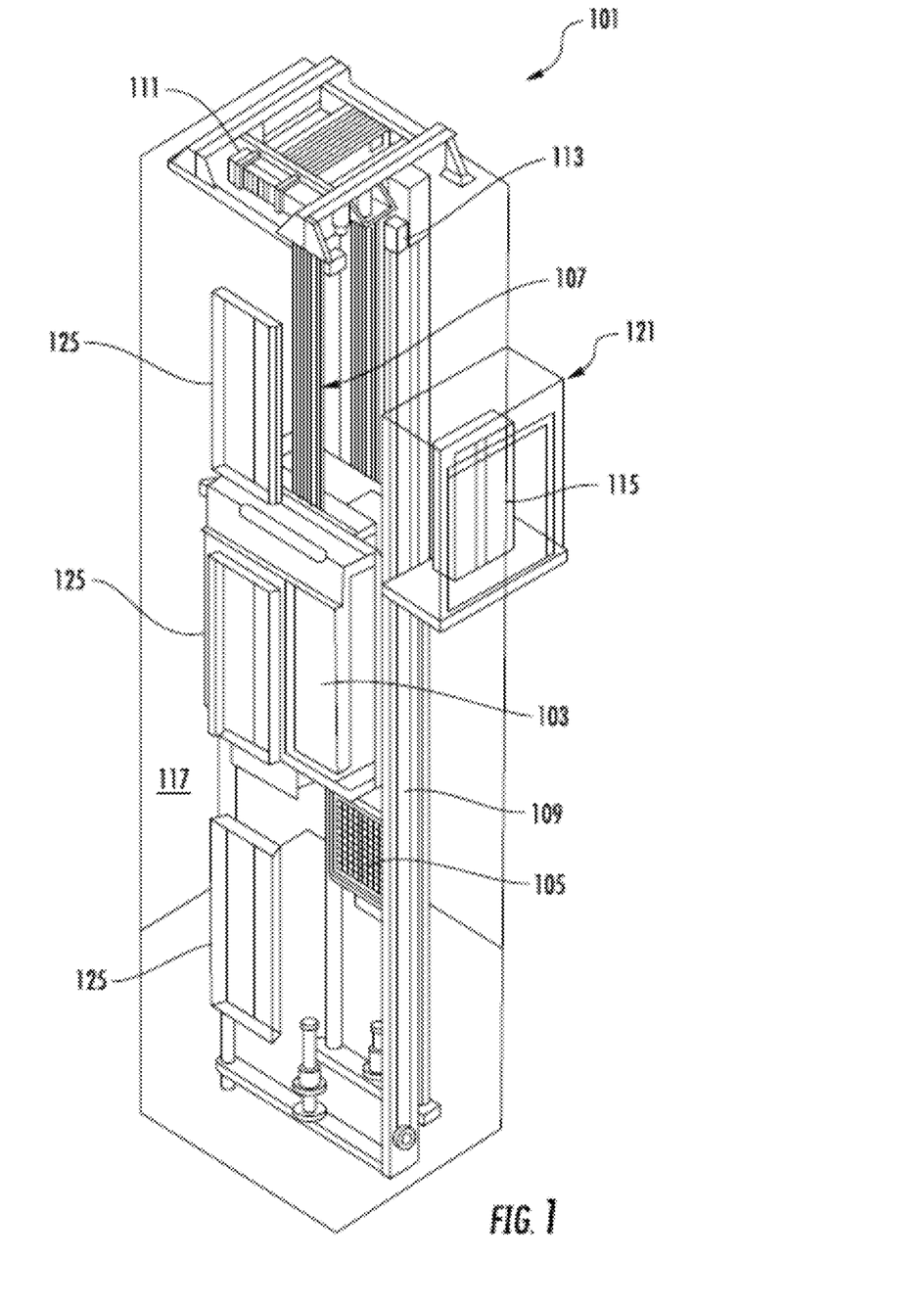
FIG. 1 is a schematic illustration of an elevator system that may employ various embodiments of the disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115.

Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
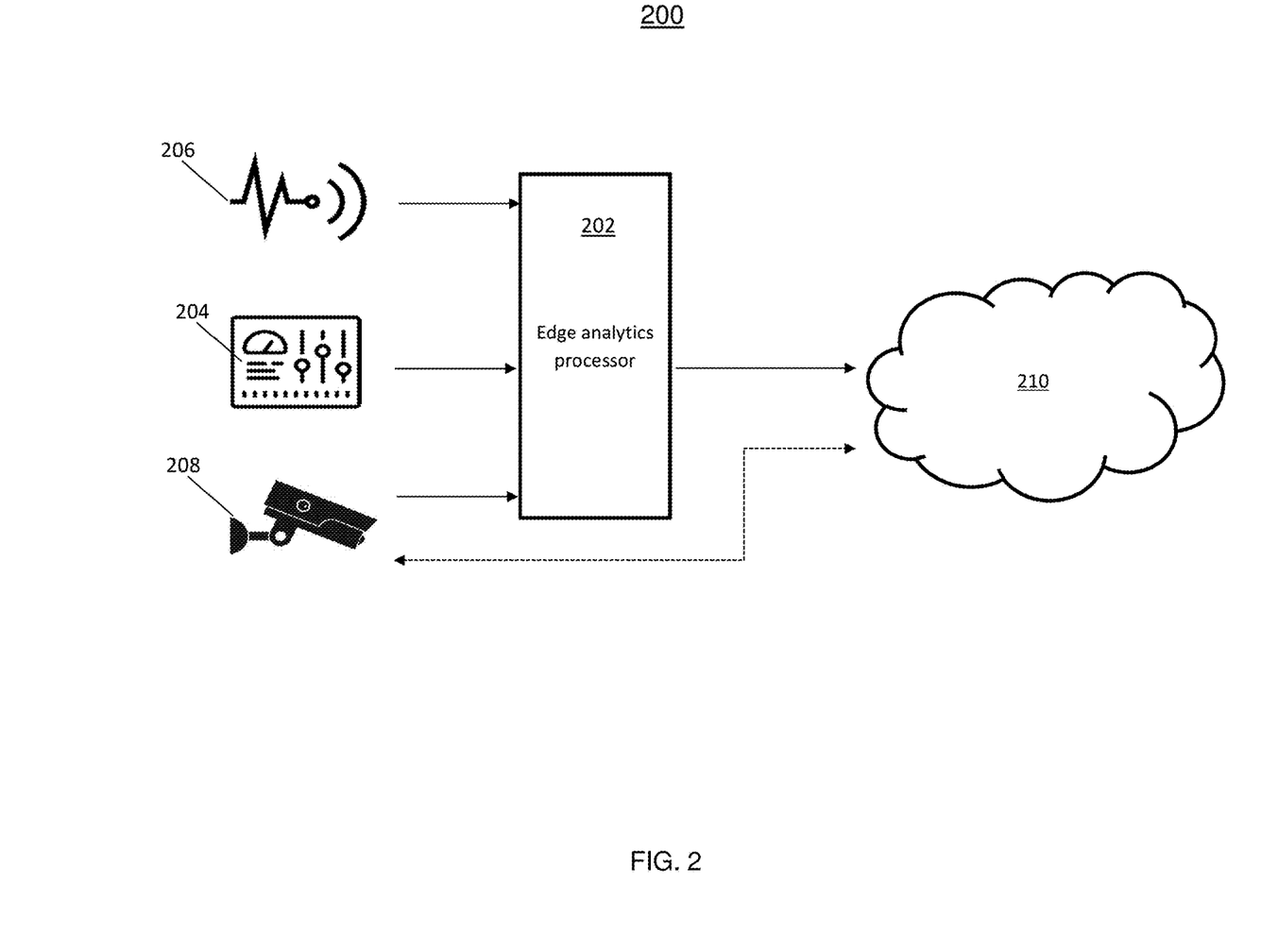
FIG. 2 depicts a system including the in-car camera in accordance with one or more embodiments of the disclosure.

Now referring to FIG. 2, a system 200 in accordance with one or more embodiments of the disclosure is shown. As shown in FIG. 2, the system includes an edge analytics processor 202 (hereinafter referred to as processor 202). The processor 202 is coupled to a controller 204 such as an elevator controller described with reference to FIG. 1. The processor 202 can obtain information for the elevator system from the controller 204 including state information such as but not limited to identify a door state information, a number of cycles/reversals of the elevator door, and abnormal behavior/failures. In one or more embodiments of the disclosure, sensors 206 can be used to detect the various conditions. The sensors 206 can include but are not limited to accelerometers, gyroscopes, hall sensors, etc. The processor 202 can obtain the sensor data directly from the sensors 206 or from the controller 204.

The system 200 also includes a camera 208 that is used to capture image data that can be used to confirm or validate a detected condition of the elevator. In addition, the image data can be used to modify the behavior and/or operation of the elevator. For example, responsive to detecting a passenger type or object, the elevator door dwell time can be modified to allow more time to board the elevator.

In some embodiments, the image analysis can be performed on the image data by a processor at the edge of the network. In another embodiment, the image data is sent to the cloud 210 and the image analysis is performed by a processor or computing device in the cloud 210. In one or more embodiments, the camera 208 can be used as a stand-alone system where the output data of the camera 208 is used for monitoring the elevator performance and CBM. In other embodiments, the output data form the camera 208 is used to control the elevator based on the image data captured by the elevator.

In one or more embodiments, the image analysis, performed by a processor after receiving the image data from the camera 208, can detect the number of door cycles and reversals, abnormal door behavior, door timing, ride quality, etc. In one or more embodiments of the disclosure, the image analysis can determine an object that is left in the elevator such as baggage or another item. An alarm can be provided to alert the passenger as they are exiting the elevator car responsive to the detection. For example, a left baggage alarm can be provided to the passenger responsive to the detection of the baggage upon departing the elevator car. The processor can be configured to perform object detection on the image data received from the camera using a variety of techniques. A plurality of known object detection algorithms can be applied to identify objects during the image analysis, and it should be understood that a plurality of object detection algorithms are known in the art for detecting various types of objects.

In other embodiments of the disclosure, the operation of the elevator can be modified based on objects that are identified in the image analysis. For example, the dispatching/door operation can be changed to modify the door dwell time or speed based upon the image analysis determining that an elderly passenger is boarding the elevator car. In another example, the dispatching/door operation can be modified if an object is identified such as a wheelchair, stroller, dolly, handcart, etc. is detected to allow the passenger additional time to board or exit the elevator car.

Figure 3:
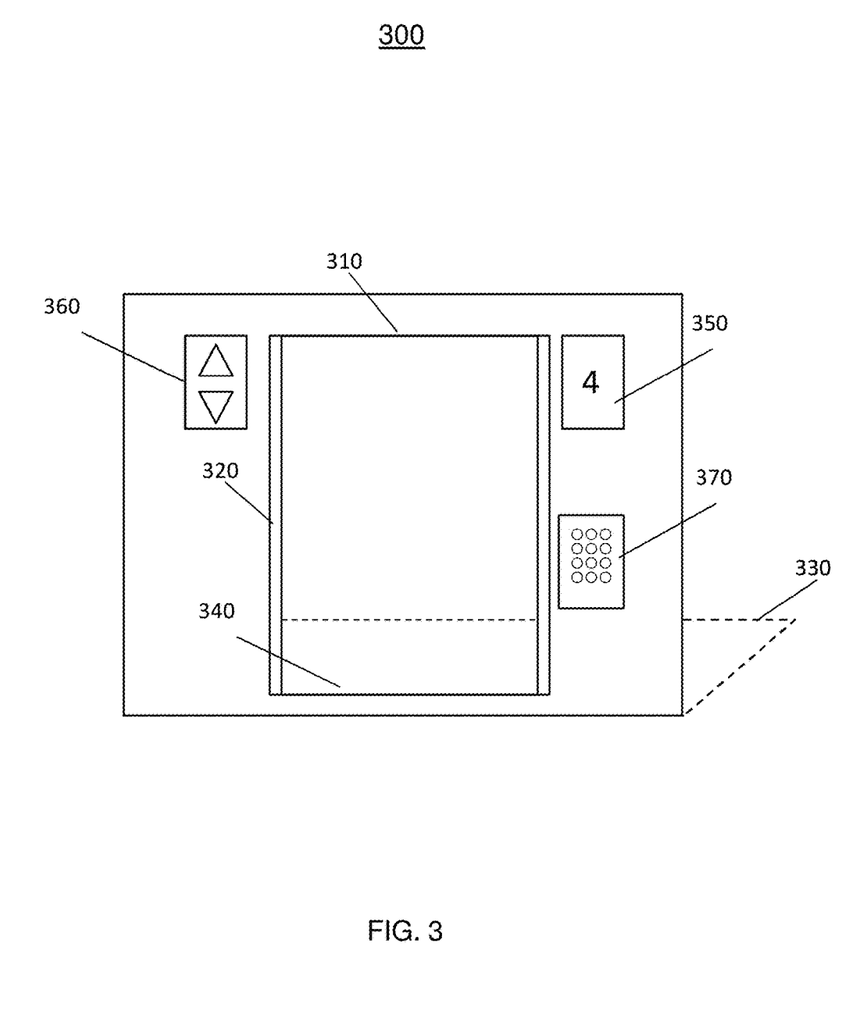
FIG. 3 depicts another example image obtained from the system in accordance with one or more embodiments of the disclosure.

Similarly, real-time passenger traffic can be monitored over a period of time to optimize the schedule for the elevator cars. In a different embodiment of the disclosure, elevators having multiple cars can be assigned based on the number of passengers in each car. This can improve the passengers' experience Now referring to FIG. 3, an example of the image data of an elevator car 300 captured by the system 200 in accordance with one or more embodiments is shown. FIG. 3 depicts the camera 208 can be positioned to monitor the elevator door threshold 310. The camera 208 can detect the alignment of the elevator door and the threshold 320. The camera 208 can also detect the alignment of the elevator floor 340 and the elevator landing 330. For example, the image data can detect if the floor is higher than the landing or lower than the landing 330. This information can be used to adjust operation of the level car to stop the car level with the landing floor. The camera 208 can also monitor the edge 320 of the elevator car which can provide an indication of the ride quality or ensure the elevator door is completely opened and closed. In one or more embodiments of the disclosure, the system 200 can monitor and detect the opening and closing of the elevators doors. Known object detection algorithms can be used during the image data analysis. Depending on the application, various types of object recognition algorithms may be employed to recognize or identify objects.

As shown in FIG. 3, the camera 208 can be used to obtain floor data from the floor indicator 350 by performing an image analysis on the image data. In this example, the camera 208 can determine the elevator is currently on the floor number "4." The camera 208 can also be used to obtain the elevator car direction information from the indicator 360. In addition, the camera 208 can be used to determine whether the appropriate buttons or indications on the floor selection panel 370, such as a cabin operating panel (COP), are illuminated at the appropriate times. It should be understood the camera 208 can be used to capture other types of information from the indicators in the elevator car and perform an image analysis system on the received image data from the camera 208.

The camera can also be used for presence detection. In one or more embodiments of the disclosure, the presence detection is performed after the door is the elevator door is closed. This can provide consistent lighting for the camera to obtain reliable image data without interference from dynamic lighting conditions. In one or more embodiments, known presence detection algorithms can be implemented to detect the presence of passengers on the elevator. In other embodiments, the closing of the door can be detecting using one or more sensors that are coupled to the elevator system.

In one or more embodiments of the disclosure, known machine learning techniques can be used to generate a traffic patterning model based on the detected traffic recorded by the camera monitoring the elevator over a period of time. The traffic patterning can be used to improve the dispatching of the elevator car or customer experience. For example, the time period experiencing the highest traffic can be identified by monitoring the elevator usage using the camera. High periods of traffic can be experienced during morning rush periods, lunch periods, or rush hour. In addition, the days of the week experiencing high traffic periods can be determined. For example, the weekdays may experience higher traffic than the weekends. The traffic information can be used to generate patterns to improve the dispatching of cars.

It should be understood that other known machine learning algorithms can be used to generate the traffic pattern information. The machine learning algorithm can learn which floors do not require long dwell times and define the dwell time for each landing.

Using a processor, the image data from the camera 208 can be compared to the state information provided by the controller 204 or sensors 206 to verify the sensor data and the elevator system state are all providing the same information. In the event the image analysis indicates the sensors are not operating properly or the state information is incorrect, the subset of data indicating false alarms can be removed. Subsequently, the conditions that have been verified using the image analysis can be used to efficiently build traffic patterning models and maintenance based models for the elevator system. It should be understood the processing can occur by a processor located locally, in a cloud network, or a combination thereof.

Figure 4:
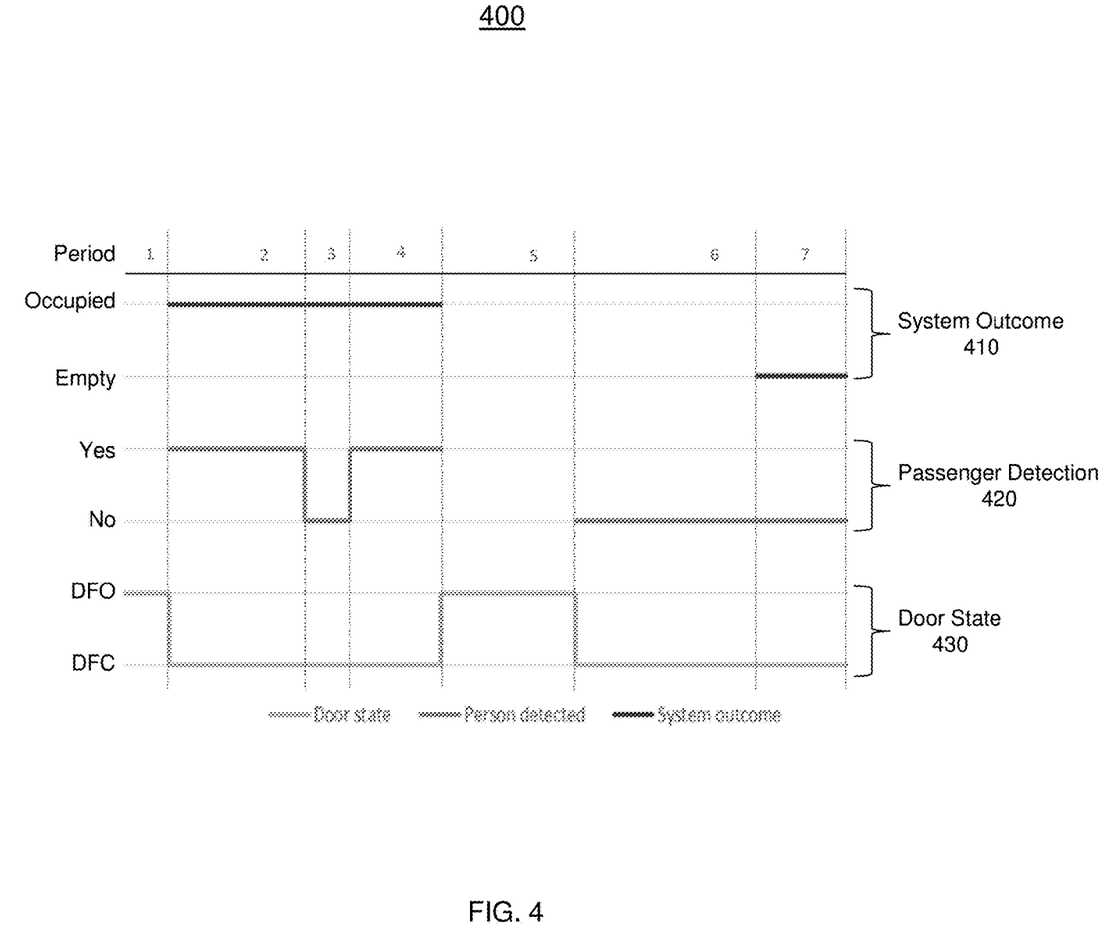
FIG. 4 depicts an example diagram of the presence detection using the camera in the system in accordance with one or more embodiments of the disclosure.

Now referring to FIG. 4, an example of the presence detection as performed by the system 200 in accordance with one or more embodiments of the disclosure is shown. The graph 400 charts the system outcome 410 for the presence detection, passenger detection 420, and the elevator door state 430. The system outcome 410 can indicate the elevator is "occupied" or "empty." The passenger detection 420 can indicate whether the camera detects a passenger ("Yes") or does not detect a passenger ("No"). The elevator door state 430 can indicate a door open state ("DFO") or a door closed state ("DCO").

As shown in FIG. 4, at time period 1, the graph 400 indicates the elevator car doors are initially open represented by the door state 430 ("DFO), and then, the elevator car doors are subsequently closed at time period 2 represented by the "DFC." At time period 2, the system, via the camera or other sensors, has detected a passenger in the elevator car and is represented by the passenger detection state 420. The system outcome 410 indicates the elevator car is "occupied."

At time period 3, the passenger may no longer be detected by the camera but since the elevator doors remain closed it is presumed the elevator is still "occupied." In a non-limiting example, the passenger may have moved to a blind spot of the camera and is undetected. At time period 4, the elevator doors remain closed ("DFC"), and the passenger presence is detected as shown on the graph 400. The system outcome 410 maintains that the elevator car remains "occupied." The passenger may have been detected because they have moved into the field of view of the camera.

At period 5, the doors have been opened ("DFO") and the system is uncertain of the presence of a passenger in the elevator car. At time period 6, upon closing the elevator doors, the system does not detect any passengers. At period 7, the system outcome indicates the elevator car is "empty" and there are no passengers detected in the elevator car and the elevator car doors are closed ("DFC"). FIG. 4 provides an example of the presence detection analysis performed by the system 200.

Figure 5:
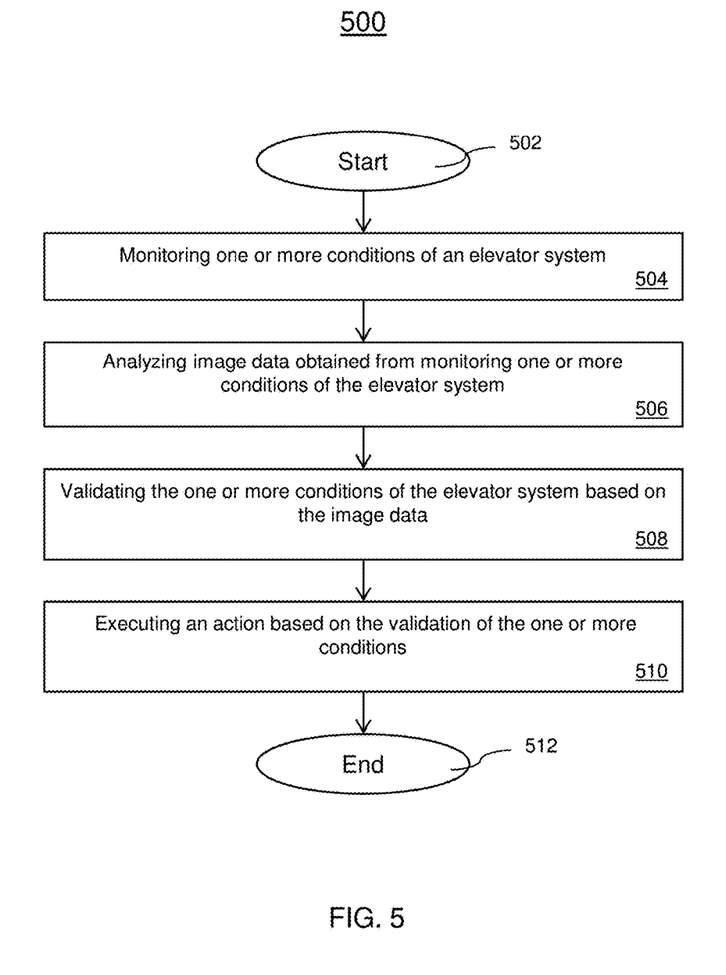
FIG. 5 depicts a flowchart of a method for operating the system in accordance with one or more embodiments of the disclosure.

Now referring to FIG. 5, a flowchart of a method 500 for using an in-car camera for operation validation in accordance with one or more embodiments of the disclosure is shown. The method 500 begins at block 502 and proceeds to block 504 which provides for monitoring one or more conditions of the elevator system. In one or more embodiments, the system receives image data from a camera such as the camera shown in FIG. 2. Block 506 analyzes the image data from the camera system. The analysis can include performing an image analysis on the image data such as facial recognition to identify passengers in the elevator. The analysis can also include object identification to detect objects such as luggage, cargo, or other objects. The analysis of the image data can also be used to collect elevator metrics such as but not limited to door reversals or cycles, passenger traffic data, malfunctioning elevator buttons, elevator door and floor alignment, etc. It should be understood that other types of analysis can be performed and other types of elevator metrics can be collected using the processor. Block 508 validates the one or more conditions of the elevator system. Block 510 executes an action based on the validation of the one or more conditions.

In one or more embodiments of the invention, the action can generate an output that is provided to an output device. The provision of outputs from the system to the output device may be by any of a number of means, e.g., by a hardwired connection, over a dedicated wireless network, over a shared wireless network, etc. The output device may be a display such as a monitor for visually communicating the detected objects, or may be an indication of the presence of a detected object or person. In one or more embodiments, the elevator can be controlled using the output from the camera. The method 500 ends at block 512.

The technical effects and benefits include improved efficient model validation. In addition, the technical effects and benefits include the ability to implement remote visual inspection of the system. In addition, a quality model can be built for the elevator system using the in-car camera to validate the data.

The technical effects and benefits include an improved passenger experience by assigning cars that are less crowded and improved dispatching algorithms. Also, the technical effects and benefits include an enhanced presence detection using the camera data. The camera data can also be used to obtain basic elevator performance indicators.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system comprising:
a camera system configured to obtain image data; and
a processor, wherein the processor is in communication with the camera system and provides image data to the processor, wherein the processor is configured to:
monitor one or more conditions of an elevator system;
analyze the image data from the camera system;
validate the one or more conditions of the elevator system based on the image data; and
execute an action based on the validation of the one or more conditions;
wherein the processor is configured to remove false alarm information based on the validation of the one or more conditions of the elevator car.

2. The system of claim 1, further comprising a controller configured to control the elevator system and provide state information to the processor.

3. The system of claim 2, wherein the processor is configured to compare the image data and indicators in the elevator system based on the state information of the elevator system; and
validate, using image analysis, the state of the elevator system based at least in part on the comparison.

4. The system of claim 1, wherein the processor is configured to generate at least one of a traffic patterning model or a maintenance model after removing the false alarm information.

5. The system of claim 1, wherein the processor is configured to perform presence detection to detect at least one of an object or a passenger in the elevator system; and
provide an alarm based at least in part on the presence detection.

6. The system of claim 1, wherein the action includes an output of the camera system that provides a command to adjust an elevator door dwell time or an elevator door speed based on identifying an object or user type.

7. The system of claim 1, wherein the action includes an output of the camera system providing a command to the elevator system to assign elevator cars based on a number of users on one or more elevator cars of the elevator system.

8. The system of claim 1, wherein monitoring the one or more conditions includes monitoring at least one of button operations of an elevator car, a cabin operating panel, a direction of an elevator car, a number of runs of an elevator car, door cycles and door reversals of an elevator car using the camera system.

9. A method for performing condition-based maintenance using a camera, the method comprising:
monitoring one or more conditions of an elevator system;
analyzing the image data from the camera system;
validating the one or more conditions of the elevator system based on the image data; and
executing an action based on the validation of the one or more conditions;
removing false alarm information based on the validation of the one or more conditions of the elevator car.

10. The method of claim 9, further comprising controlling, using a controller, the elevator system and provide state information to the processor.

11. The method of claim 10, further comprising comparing the image data and indicators in the elevator system based on the state information of the elevator system; and
validating the state information of the elevator system based at least in part on the comparison.

12. The method of claim 11, further comprising generating at least one of a traffic patterning model or a maintenance model after removing the false alarm information.

13. The method of claim 9, further comprising performing presence detection to detect at least one of an object or a passenger in the elevator system; and
providing an alarm based at least in part on the presence detection.

14. The method of claim 13, wherein the alarm is a left baggage alarm.

15. The method of claim 9, wherein the action includes at least one of performing condition-based maintenance or monitoring the performance of the elevator system.

16. The method of claim 9, wherein the action includes an output of the camera system provides a command to adjust an elevator door dwell time or an elevator door speed based on identifying an object or user type.

17. The method of claim 9, wherein the action includes an output of the camera system that provides a command to the elevator system to assign elevator cars based on a number of users on one or more elevator cars of the elevator system.

18. The method of claim 9, wherein monitoring the one or more conditions includes monitoring at least one of button operations of an elevator car, a cabin operating panel, a direction of an elevator car, a number of runs of an elevator car, door cycles and door reversals of an elevator car using the camera system.

19. A system comprising:
a camera system configured to obtain image data; and
a processor, wherein the processor is in communication with the camera system and provides image data to the processor, wherein the processor is configured to:
monitor one or more conditions of an elevator system;
analyze the image data from the camera system;
validate the one or more conditions of the elevator system based on the image data; and
execute an action based on the validation of the one or more conditions;
wherein the action includes at least one of performing condition-based maintenance or monitoring the performance of the elevator system.

* * * * *